US 9,491,302 B2

(12) United States Patent
Brittain (10) Patent No.: US 9,491,302 B2
(45) Date of Patent: Nov. 8, 2016

(54) TELEPHONE CALL PROCESSING METHOD AND APPARATUS (71) Applicant: Metaswitch Networks Ltd., Enfield (GB)

(72) Inventor: Paul Brittain, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 383 days.

(21) Appl. No.: 14/039,969

(22) Filed: Sep. 27, 2013

(65) Prior Publication Data
US 2014/0023067 A1 Jan. 23, 2014

Related U.S. Application Data
(63) Continuation of application No. PCT/GB2012/050691, filed on Mar. 28, 2012.

(30) Foreign Application Priority Data
Mar. 28, 2011 (GB) .................................. 1105166.1

(51) Int. Cl.
*H04M 7/00* (2006.01)
*H04L 12/911* (2013.01)
*H04L 29/06* (2006.01)
(Continued)

(52) U.S. Cl.
CPC ............ *H04M 7/006* (2013.01); *H04L 47/745* (2013.01); *H04L 63/1458* (2013.01); *H04M 3/367* (2013.01); *H04M 3/436* (2013.01); *H04Q 2213/13164* (2013.01); *H04Q 2213/13166* (2013.01); *H04Q 2213/13204* (2013.01);
(Continued)

(58) Field of Classification Search
None
See application file for complete search history.

(56) References Cited

U.S. PATENT DOCUMENTS 6,724,747 B1   4/2004   Arango et al.
6,792,099 B1   9/2004   Na
(Continued)

FOREIGN PATENT DOCUMENTS

EP   1 478 157 A1   11/2004
EP   1 560 398 A2    8/2005
(Continued)

OTHER PUBLICATIONS

International Search Report issued in PCT/GB2012/050691.
(Continued)

*Primary Examiner* — Hassan Phillips
*Assistant Examiner* — Gautam Sharma
(74) *Attorney, Agent, or Firm* — EIP US LLP (57) ABSTRACT Methods, apparatus and computer program products for processing signaling information for telephone call attempts in a packet-based telephony service. An overload protection node is introduced to protect a signaling node from an overload of signaling information for telephone call attempts. A characteristic of signaling information for telephone call attempts in the packet-based telephony service is monitored by the overload protection node and on the basis of the monitored characteristic, the overload protection node processes signaling information for telephone call attempts according to one of a number of different modes of operation. A mode of operation may involve transmitting signaling information for a call attempt to the signaling node or selecting one or more call attempts at the overload protection node for the purpose of reducing overload in the signaling node.

20 Claims, 8 Drawing Sheets (51) Int. Cl.
*H04M 3/36* (2006.01)
*H04M 3/436* (2006.01)
*H04W 76/02* (2009.01)

(52) U.S. Cl.
CPC ............ *H04Q2213/13348* (2013.01); *H04Q 2213/13389* (2013.01); *H04W 76/027* (2013.01)

(56) References Cited

U.S. PATENT DOCUMENTS

| | | | |
|---|---|---|---|
| 6,795,395 | B1 | 9/2004 | Khasnabish |
| 7,209,473 | B1 * | 4/2007 | Mohaban ................ H04L 29/06 370/235 |
| 2006/0072451 | A1 | 4/2006 | Ross |
| 2006/0077964 | A1 * | 4/2006 | Wu .................... H04L 41/0893 370/352 |
| 2006/0285493 | A1 | 12/2006 | Manuja et al. |
| 2007/0195774 | A1 * | 8/2007 | Sherman ............. H04L 49/3009 370/392 |
| 2008/0222724 | A1 * | 9/2008 | Ormazabal ......... H04L 63/1458 726/23 |
| 2009/0028135 | A1 * | 1/2009 | Mantripragada ....... H04L 12/66 370/352 |
| 2009/0094671 | A1 * | 4/2009 | Kurapati ............. H04L 63/1458 726/1 |
| 2009/0122701 | A1 | 5/2009 | Goldman et al. |
| 2009/0129560 | A1 * | 5/2009 | Bowden ........... G06Q 10/06311 379/32.01 |
| 2009/0293123 | A1 * | 11/2009 | Jackson .............. H04L 63/1458 726/23 |
| 2010/0154057 | A1 * | 6/2010 | Ko ...................... H04L 63/1416 726/23 |

FOREIGN PATENT DOCUMENTS

| | | |
|---|---|---|
| EP | 1 788 752 A1 | 5/2007 |
| WO | 02/19739 A2 | 3/2002 |
| WO | 2006/040201 A1 | 4/2006 |

OTHER PUBLICATIONS

Search Report issued in GB Patent Application No. 1105166.1.

* cited by examiner

PRIOR ART

TELEPHONE CALL PROCESSING METHOD AND APPARATUS

CROSS REFERENCE TO RELATED APPLICATIONS

This application is a continuation of International Application No. PCT/GB2012/050691, filed Mar. 28, 2012 and designating the U.S., which claims priority to UK patent application no. 1105166.1, filed on Mar. 28, 2011 both of which are incorporated herein by reference in their entirety.

TECHNICAL FIELD

This disclosure relates to a telecommunications network and methods for processing signaling information for telephone calls in a packet-based part of the telecommunications network. In particular, but not exclusively, this disclosure relates to the operation of a new network node in a packet-based telephony service for protecting a call agent from an overload of signaling information.

BACKGROUND

Figure 1A:
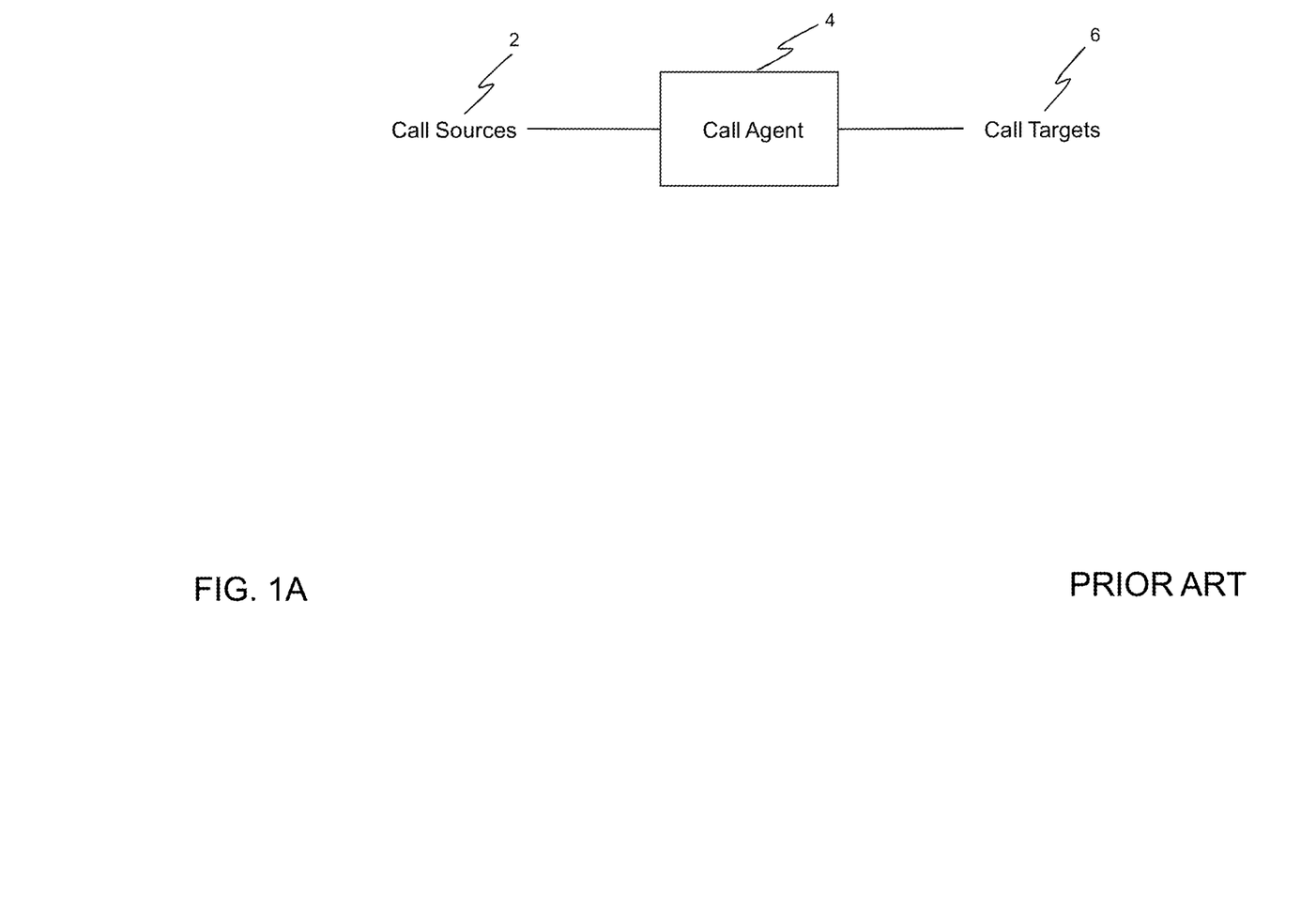
FIG. 1A is a system diagram showing a telecommunications network including a packet-based telephony service according to the prior art.

FIG. 1A shows a conventional telecommunications network which includes a packet-based telephone service. The telephone service may for example include voice, fax, video-phone and streaming video capabilities or a combination of these or suchlike, but will hereinafter be referred to as a telephone service.

Telephone calls can be sent as packet-based data using the Internet Protocol (IP), and such calls are known as Voice over Internet Protocol (VoIP) calls. Telephone calls may be placed through several types of connections such as a Plain Old Telephone System (POTS) connection, an integrated Services Digital Network (ISDN) connection or a Voice over Digital Subscriber Line (VoDSL) connection, the latter being suitable for transmitting analogue voice calls and packet-based data simultaneously down the same telephone line. Other connections such as other broadband type connections or wireless connections could also be present here.

Calls can be routed to an entity 4 known as a call agent, media gateway controller or softswitch, the first of these three terms being used hereinafter, responsible for handling signaling information for telephone calls in the network. Calls could be routed to the call agent from one of a number of call sources 2 including Multi-Service Access Nodes (MSANs), Session Initiation Protocol (SIP) telephones, Media Gateways (MGs) and other call agents in the same or different networks. Several call sources may be connected to the same call agent and many other call agents may be necessary depending on the size and complexity of the network.

Call agents typically provide the intelligence that controls connection services, the ability to select processes that can be applied to a call, routing for a call within the network based on signaling and subscriber database information, the ability to transfer control of the call to another network element and management functions such as provisioning, fault detection and billing. For ease of explanation, it is hereafter assumed that a call agent is one network entity, although in practice it may be a distributed set of entities.

The call agent 4 typically processes the signaling information for calls received from one or more call sources 2 and then routes the calls to one or more call targets 6. The call sources and call targets may include the same set, or overlapping sets, of endpoints, such as telephony devices. Telephony devices are typically capable of acting as a call source or a call target depending on whether they are the source or target of a call attempt.

Figure 1B:
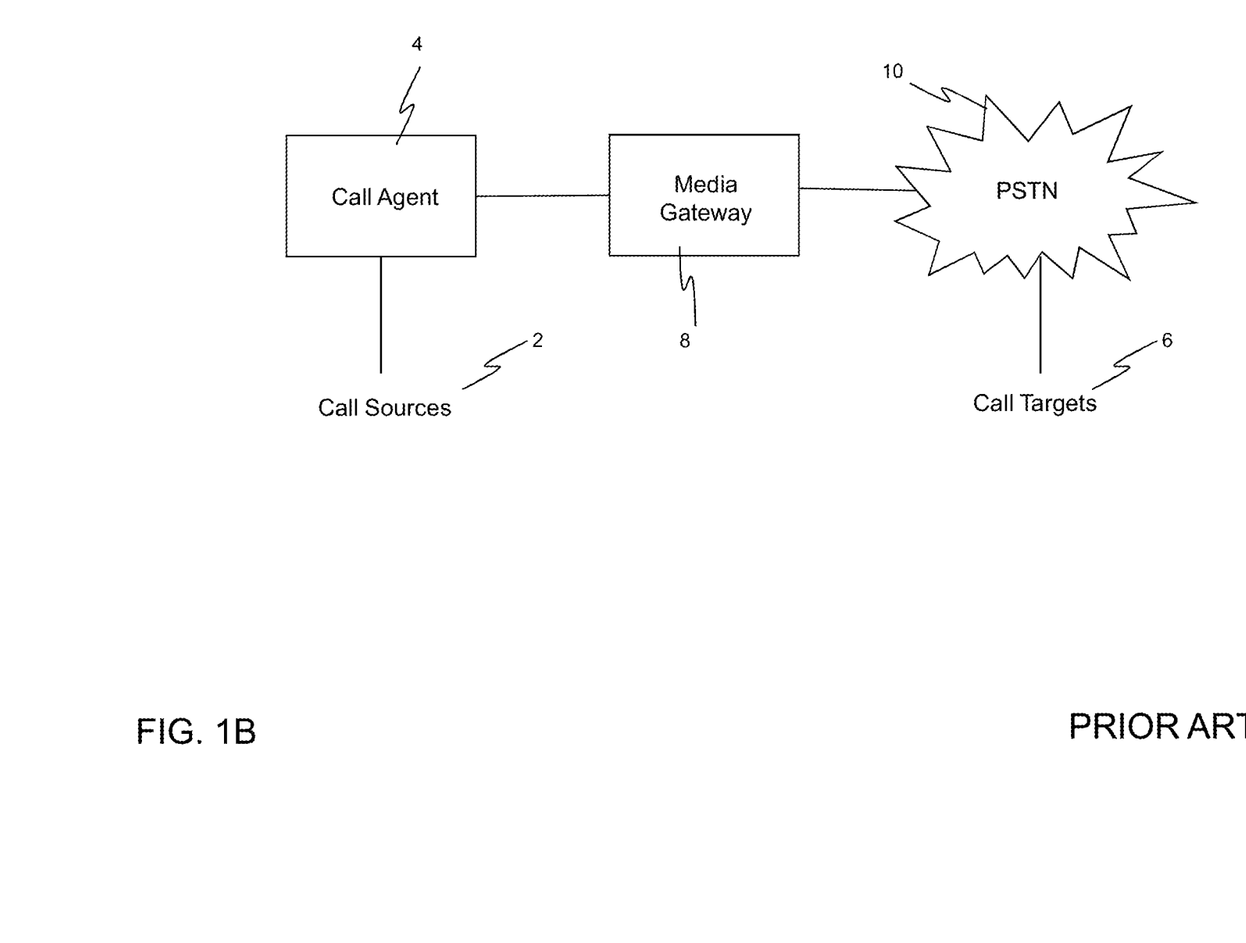
FIG. 1B is a system diagram showing a telecommunications network including a packet-based telephony service according to the prior art.

FIG. 1B shows an exemplary conventional telecommunications network wherein call agent 4 routes calls received from call sources 2 to another network entity, typically a media gateway 8, but alternatively another call agent or MSAN. A media gateway operates on the boundary between two different network protocol environments, facilitating communication between the two environments. The media gateway 8 typically includes communications switch equipment (not shown) and operates between a packet-based part of the telecommunications network and the Public Switched Telephone Network 10.

Whereas the call agent handles signaling data for calls, there may similarly be a media node (not shown) or switch responsible for handling the call media data. The media node could be a part of the media gateway, or alternatively be a separate network entity. Media data includes the payload of the call (for example the voice or video data) as opposed to the signaling data packets used for controlling the call. A media node is responsible for processing the higher bandwidth connections required for delivering media data, and typically incorporates multiplexing functionality.

During normal operation, a call agent in a conventional packet-based telecommunications network is typically able to handle all the signaling information for the call attempts it receives. However, if a call agent in a conventional packet-based telecommunications network receives more signaling information for call attempts than it is able to handle it will go into overload. When a call agent is in overload it is nearing or has reached the limit of its processing capabilities and new call attempts will either be buffered into an overload queue, thereby causing the call attempts to be delayed, or the call attempts will be dropped altogether. The overload queue may be separate from the requisite input buffer queue in the call agent or may be an extension of this.

Such an overload of signaling information may be caused by an increased number of genuine telephone call attempts, for example during a scheduled mass calling event such as a telephone voting event or a telephone ticket sales event. An overload may also be caused by a large amount of bogus call attempts caused by a malicious Denial of Service (DoS) attack on the network by a "hacker" or "phreaker" intent on disrupting the network or particular pans of the network. Such an attack may involve a plurality of network entities distributed across the network targeting one or more other network entities so that such a distributed attack, known as a Distributed Denial of Service (DDoS), may be difficult to prevent or stop once it has begun.

A known system provides a method and system which use a call agent for exercising management over endpoints communicating over a packet-based network. An endpoint can call and be called and is where media data for a call is generated or terminated such as a Session Initiation Protocol (SIP) terminal or gateway. The communications supported include VoIP, Voice over Asynchronous Transfer Mode (VoATM), video conferencing, data transfer and telephony. The call agent sets up a connection for a communication and then the media information is transferred between the endpoints via media gateways in a similar network to that depicted in FIG. 1B. Clusters of call agents are distributed across the network to handle access attempts from different locations, but there is no mention of any ability to accommodate an overload of attempts to access the network either from genuine or malicious sources.

Various mechanisms have been proposed to try and provide effective congestion control in packet-based telecommunications networks. One such proposed mechanism involves including protocol specific extensions, for example in the existing Megaco media gateway control protocol (International Telecommunication Union Telecommunication Standardization Sector (ITU-T) Recommendation H.248) and SIP, where the overload control is performed on the originating MSANs. A more recent generic overload signaling protocol known as the Generic Overload Control Activation Protocol (GOCAP) has also been proposed, possibly including multicast flows where a single overload control packet can be addressed to multiple recipients over the network, which could be utilized in preference to multiple per-protocol extension solutions. Alternatively, overload control can be carried out either in the call agent or at end points.

Whilst the above mechanisms work in some circumstances, they all suffer from the fact that effective scaling of the mechanism over the network cannot readily be achieved cost-effectively. There are several causes of this difficulty.

Firstly, call agents typically maintain state information for each call attempt and replicate that state between primary and backup call agent processing elements in order to ensure full transparency of service across a hardware or network failure. The storage and replication of this call state requires considerable resources, limiting the call agent's scalability and hence capacity to handle arbitrarily large signaling loads.

Secondly, existing protocol-specific congestion control mechanisms, such as ITU-T Recommendation H.248.11 typically focus on protecting the MSAN or MG nodes from overload by the call agent. This is because the call agent typically has a faster processor and is able to generate more messages than a single MSAN or MG can handle. However the aggregate of all MSANs and MGs connected to a single call agent could still potentially overload that call agent, or specific endpoints may be compromised and used as part of a signaling-based DDoS attack on the call agent or part of the network.

Any solution requiring a unicast overload control packet to flow to each endpoint would be slow to react to rapid rises in call attempts and would create a large amount of load on the network itself hence adding to the network overload. There can also be problems ensuring fairness across a large number of endpoints each of which is independently applying call overload control. Any solution requiring multicast overload control packets inherently relies on the increased complexity of miming reliable multicast services across the Internet Protocol (IP) core or access networks. Any solution placing call overload control in the call agent requires the call agent to be able to scale to tolerate any conceivable load of call attempts, which is unrealistic. Furthermore, any solution requiring collaboration from the end points to achieve overload control cannot solve a DDoS attack where large numbers of endpoints can be compromised or spoofed.

Thus, a problem with conventional packet-based telecommunications networks is that there is no effective, scalable mechanism for preventing overload of call agents due to a high number of requests for access to the network, which typically leads to the network services being unable to provide an acceptable quality of service during such events.

It would be desirable to provide improved measures for preventing overload of call agents in a packet-based telecommunications network.

SUMMARY

In accordance with first embodiments, there is a method for processing signaling information for telephone call attempts in a packet-based telephony service, the method comprising the steps of:

receiving, at a first overload protection node, signaling information for telephone call attempts in the packet-based telephony service, the first overload protection node being responsible for protecting a first signaling node from an overload of signaling information for telephone call attempts, the first signaling node being responsible for handling signaling information for telephone calls in the packet-based telephony service for which media data is handled by a media node;

monitoring, at the first overload protection node, a characteristic of signaling information for telephone call attempts in the packet-based telephony service;

in response to the monitoring indicating the signaling characteristic being in a first state, processing, at the first overload protection node, signaling information for a first call attempt according to a first mode of operation;

in response to the monitoring indicating the signaling characteristic being in a second, different state, processing, at the first overload protection node, signaling information for the first call attempt according to a second, different mode of operation; and in response to the monitoring indicating the signaling characteristic changing between the first state and the second state, transmitting one or more signals from the first overload protection node to one or more further overload protection nodes.

Hence, a signaling node responsible for handling signaling information for telephone calls in a packet-based telephony service can be protected by an overload protection node from an overload of signaling information for telephone call attempts in a packet-based telephony service. The overload protection node could be implemented in the form of a server or similar entity or group thereof. Further, a potential DoS attack (or other overload situation) can be rapidly communicated throughout the packet based network, thereby alerting further overload protection nodes to the potential threat before other signaling nodes reach overload conditions.

According to second embodiments, there is provided apparatus for processing signaling information for telephone call attempts in a packet-based telephony service, the apparatus being adapted to:

receive at a first overload protection node signaling information for telephone call attempts in the packet-based telephony service, the first overload protection node being responsible for protecting a first signaling node from an overload of signaling information for telephone call attempts, the first signaling node being responsible for handling signaling information for telephone calls in the packet-based telephony service for which media data is handled by a media node;

monitor, at the first overload protection node, a characteristic of signaling information for telephone call attempts in the packet-based telephony service;

in response to the monitoring indicating the signaling characteristic being in a first state, process, at the first overload protection node, signaling information for a first call attempt according to a first mode of operation;

in response to the monitoring indicating the signaling characteristic being in a second, different state, process, at the first overload protection node, signaling information for the first call attempt according to a second, different mode of operation; and in response to the monitoring indicating the signaling characteristic changing between the first state and the second state, transmit one or more signals from the first overload protection node to one or more further overload protection nodes.

According to third embodiments, there is a computer program product comprising a non-transitory computer-readable storage medium having computer readable instructions stored thereon, the computer readable instructions being executable by a computerized device to cause the computerized device to perform the method of the first embodiments.

Further features will become apparent from the following description of embodiments, given by way of example only, which is made with reference to the accompanying drawings.

DETAILED DESCRIPTION

Figure 2A:
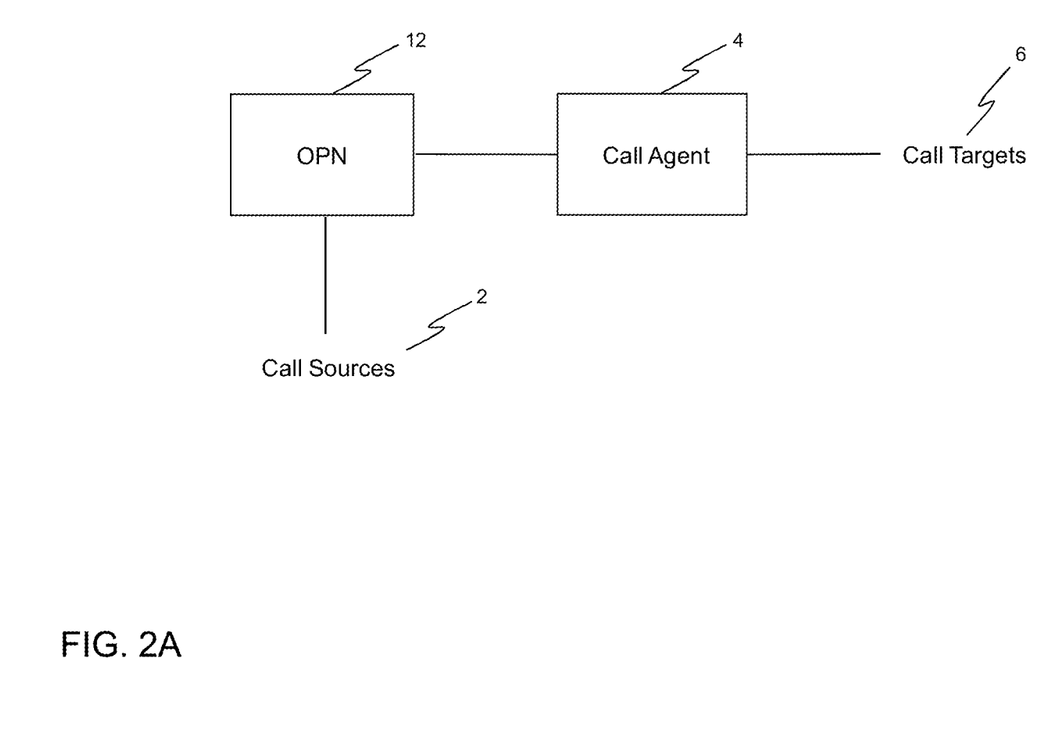
FIG. 2A is a system diagram showing a telecommunications network including a packet-based telephony service and an overload protection node according to an embodiment.

A diagram showing telephone call processing by an overload protection node in a packet-based telephony service according to an embodiment is shown in FIG. 2A. Many of the components shown in FIG. 2A are necessarily present in the prior art system of FIG. 1A and are given the same item numbers in both figures. The system of FIG. 2A has a new network entity called an overload protection node 12 located between a number of call sources 2 and a call agent 4. The overload protection node 12 is responsible for protecting a first signaling node (shown as call agent 4 in FIG. 2a) from an overload of signaling information for telephone call attempts in a packet-based telephony service provided over a packet-based telecommunications network.

Figure 2B:
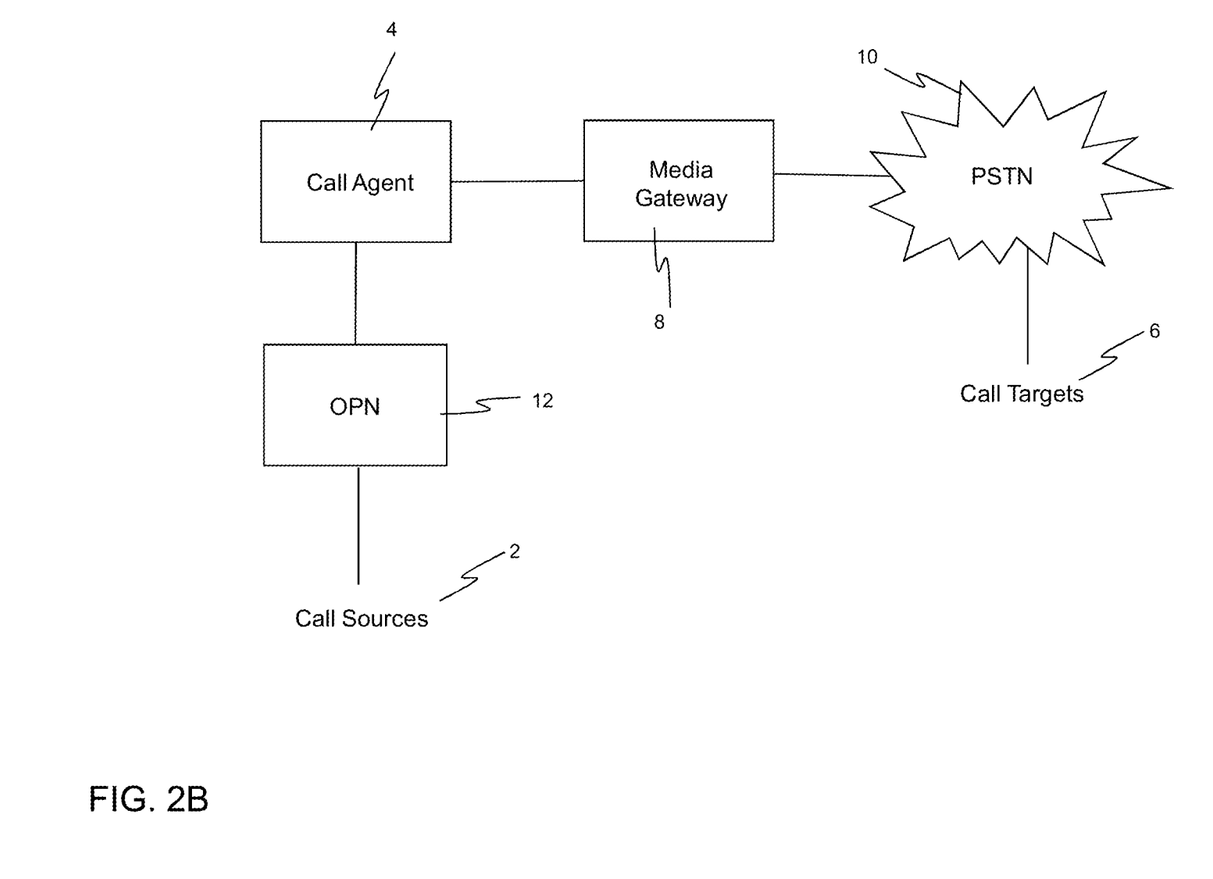
FIG. 2B is a system diagram showing a telecommunications network including a packet-based telephony service and an overload protection node according to an embodiment.

FIG. 2B shows an exemplary arrangement of an overload protection node in a packet-based telephony service according to embodiments. Many of the components shown in FIG. 2B are necessarily present in the prior art system of FIG. 1B and are given the same item numbers in both figures. The operation of the overload protection node will now be described with reference to both FIG. 2A and FIG. 2B.

The overload protection node 12 receives from call source(s) 2 signaling information for any call attempts that are requesting access to the packet-based telephony service via call agent 4. The overload protection node 12 has the ability to decide whether a call attempt will result in a telephone call that is handled by call agent 4. The overload protection node 12 does this by analyzing the signaling information for the call attempt and deciding whether to grant the call attempt access to the network by transmitting the signaling information on to the call agent 4, or to deny the call attempt access to the network, for example by discarding the signaling information for the call attempt or providing a negative response to the call attempt. Depending on the communication protocol in use, merely discarding the signaling information may not be an appropriate method of terminating the call attempt. For example, master/slave protocols such as H.248, may require the line to be reset, ready for the next call attempt. Such a reset is typically not required for peer-to-peer protocols like SIP.

One or more characteristics of signaling information for telephone call attempts in the packet-based telephony service are analyzed, either at the call agent or at the overload protection node. The state of each characteristic is determined and, depending on its state, the signaling information for a call attempt is processed according to different modes of operation. The different modes of operation are such that signaling information for a call attempt received when the overload protection node is in one mode of operation may be processed differently when the overload protection node is in a different mode of operation.

A monitored characteristic of the signaling information may for example be the number of call attempts in progress simultaneously at the overload protection node or the rate or time at which call attempts are received at the overload protection node. A characteristic could in addition, or alternatively, depend on the sources or targets of received call attempts, and the pattern of call attempts from each source or group of sources or the pattern of call attempts towards each target or group of targets.

In the former example, the characteristic could then be in a first state if the rate of receipt of call attempts is below the signaling information handling capacity of the signaling node and the characteristic could be in a second, different state if the rate of receipt of call attempts is above the signaling information handling capacity of the signaling node. The signaling information handling capacity is then the rate that call attempts can be routed through to the call agent with the call agent being able to handle the signaling information for all the resulting telephone calls (normal operating mode). If the call agent received signaling information at a rate above its signaling information handling capacity, the call agent would not have the processing capabilities to handle all of the resulting telephone calls i.e. this would overload the call agent (overload operating mode).

Transition of the characteristic can be detected by the overload protection node in several ways. Firstly, a dedicated message may be sent from the call agent to the overload protection node when the call agent reaches/nears its handling capacity. Secondly, by monitoring standard protocol flows, including for example the responses to previous call attempts, the operating mode of the call agent could be deduced. Thirdly, the overload protection node could be configured with the signaling information handling capacity of the call agent and identify for itself the point at which this threshold is passed.

When the overload protection node is in normal operating mode, it will transmit the signaling information for call attempts it receives on to the respective call agent. When the overload protection node is in overload operating mode, it selects one or more call attempts to deny access to the network and either discards the signaling information for these call attempts, or provides a negative response to the call attempt and takes any protocol specific action required to free up line resources for the next call attempt.

Priority Lists

Some embodiments include the use of two lists, one white and one black, for prioritizing call attempts. Two variant schemes are proposed for the operation of these priority lists. A 'hard' type of operation which provides mechanisms by which a present mode of the overload protection node may be overridden, and a 'soft' type of operation provides mechanisms by which higher priority calls are passed on to the call agent, and lower priority calls are the first to be discarded, while still ensuring that the call agent is protected from an overload level of signaling information.

The black list contains a list of telephony call identifiers whereby a subset of call attempts may be identified. The telephony call identifiers could for example be telephone numbers or IP addresses for suspicious sources or targets. These could be identifiers associated with previous DDoS attacks on the network, those currently being used for a DDoS attack on the network or even identifiers under suspicion of being used for such attacks in the future. The identifiers could also be used to deny access to call attempts from or to certain areas of the network or at certain times etc. If a call attempt is identified by the overload protection node as being associated with a telephony call identifier on the black list, the signaling information for that call attempt will be handled according to a black-list mode of operation. Under 'hard' black list operation, call attempts with black listed call identifiers may be discarded automatically even if the overload protection node is in normal operating mode. Under 'soft' black-list operation, call attempts with black listed call identifiers are preferentially selected for denial of access to the telephone network when trying to reduce overload at the call agent. The black list can be dynamically updated, for example by adding one or more telephony call identifiers associated with a current DDoS attack.

The white list contains a list of telephony call identifiers whereby a different subset of call attempts may be identified. Again, the telephony call identifiers could be telephone numbers or IP addresses, but in contrast to the black list, call attempts identified as being associated with telephony call identifiers that are contained on the white list are associated with trusted sources or vital targets for example emergency calls or other essential services such as government institutions.

Under 'hard' white-list operation, a call attempt identified by the overload protection node as being on the white list is transmitted to the call agent even if the overload protection node is in a mode of operation that would otherwise not grant the call attempt access to the network.

Under 'soft' white list operation, call attempts with white-listed call identifiers are the last to be selected for denial of access to the telephone network when trying to reduce overload at the call agent. The white list thus acts in a mirroring fashion to the black list in prioritizing the call attempts passed on to the overload protection node.

Figure 3:
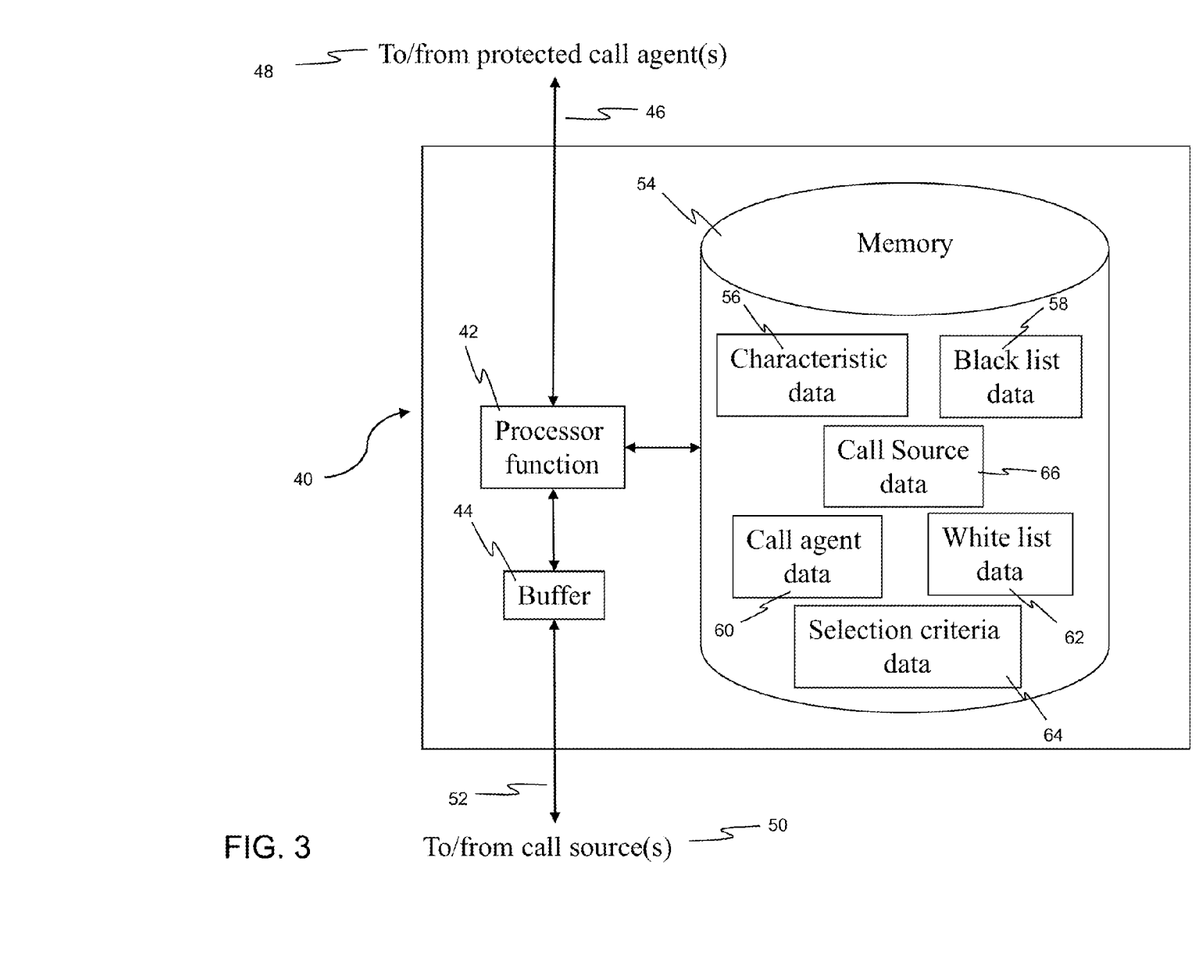
FIG. 3 is a schematic diagram of an overload protection node according to an embodiment.

FIG. 3 is a schematic diagram showing the components in an example overload protection node 40. The overload protection node has a processor function 42 (possibly more than one) which is responsible for processing data for call attempts received from one or more call sources 50 via a first in/out interface 52. Call attempts are queued into a buffer 44, before being passed to the processor 42 for processing. Call attempts associated with the white list may be moved to the front of the queue. The overload protection node 40 is connected to one or more call agents 48 via a second in/out interface 46.

The processor function 42 is able to access and update a memory portion 54 or database which is used for storing data associated with the black list 58 and data associated with the white list 62. The memory 54 can be used to store data 60 associated with the call agent(s) that the overload protection node 40 is serving, for example data relating to the signaling information handling capacity of a call agent or the current operating mode of a call agent. The memory 54 may also be used to store data 56 associated with one or more characteristics that are being monitored, for example data relating to a calculation of a rate at which call attempts are received. The memory 54 can also be used to store data 64 associated with the selection of which call attempts are to be dropped (as described hereinafter). The memory 54 can further be used to store data 66 indicating on which line reset signaling is required for each call source (for protocols that require it such as H.248.11/).

Processing Call Attempts

Figure 4A:
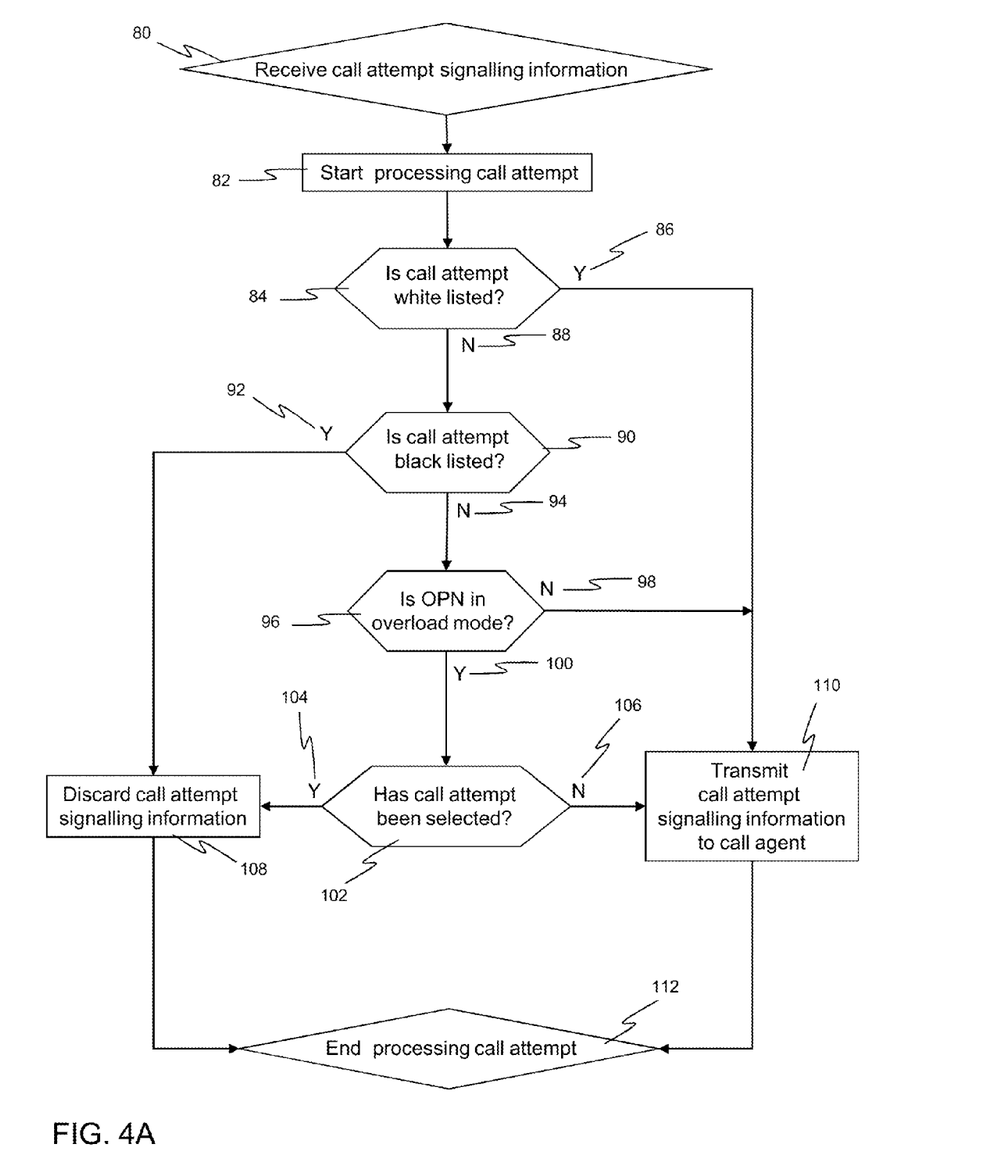
FIG. 4A is a flow-chart showing the processing of a call attempt at an overload protection node according to an embodiment.
Figure 4B:
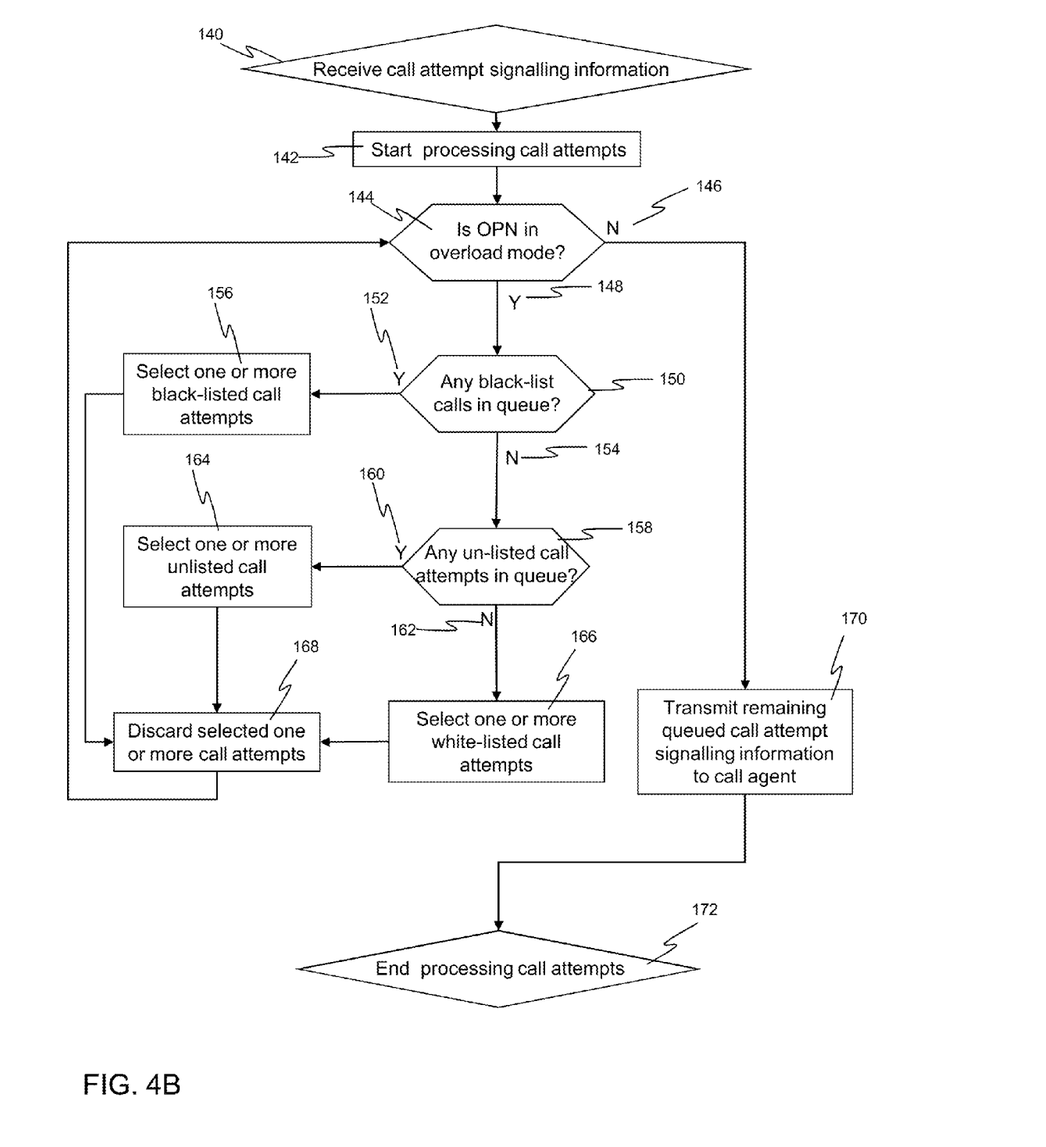
FIG. 4B is a flow-chart showing the processing of a call attempt at an overload protection node according to an embodiment.

FIGS. 4A and 4B are flow-charts showing the steps involved in the processing of a call attempt at an overload protection node according to embodiments.

FIG. 4A shows the operation according to a 'hard' black/white list embodiment. The signaling information for a call attempt is received at the overload protection node in step 80. When the processor in the overload protection node is ready to process this call attempt, it starts processing the call attempt in step 82 by analyzing the signaling information for the call attempt for data corresponding to a telephony call identifier, which is then checked against the white list in step 84.

If the telephony call identifier is on the white list, step 86, then the call attempt should be granted access to the network and the signaling information for the call attempt is transmitted to the call agent in step 110 or at least moved to the front of the queue. The overload protection node will transmit all further signaling flows for the call to the call agent until the call is finished. When the call is finished, the call agent tears-down the call and processing of the call ends in step 112.

If the telephony call identifier is not on the white list, step 88, then the overload protection node checks the telephony call identifier against the black list in step 90.

If the telephony call identifier is on the black list, step 92, then the call attempt should not be granted access to the network and the signaling information for the call attempt is not transmitted to the call agent. Instead, the signaling information is discarded in step 108, and processing of the call attempt ends at step 112. The discarding step may include any necessary further actions required to free up line resources for future call attempts, or other protocol specific actions.

If the telephony call identifier is not on the black list, step 94, then the decision to grant the call attempt access to the network will depend on what mode the overload protection node is in at step 96. If the overload protection node is not in overload mode, step 98, then the call attempt will be granted access to the network and the signaling information for the call attempt is transmitted to the call agent in step 110, until the call finishes and processing of the call ends in step 112.

If the overload protection node is in overload mode, at step 100, then the overload protection node checks whether the call attempt is included in the one or more call attempts that have been selected for access denial in step 102. If the call attempt has been selected for access denial i.e. it is one of the call attempts that has been chosen to be dropped in order to reduce the load on the network (as described hereinafter), step 104, then the signaling information for the call attempt and any further signaling information for the call attempt is discarded, as shown in step 108, and processing of the call attempt ends in step 112. If the call attempt has not been selected for access denial, step 106, then the call attempt will be granted access to the network and the signaling information for the call attempt is transmitted to the call agent in step 110, until the call finishes and processing of the call ends in step 112.

FIG. 4B shows the operation of the overload protection node according to a 'soft' black/white list embodiment. The signaling information for one or more call attempts is received at the overload protection node in step 140. When the processor in the overload protection node is ready to process the call attempts, it starts processing the call attempts in step 142.

Initially, the decision to grant the call attempts access to the network will depend on what mode the overload protection node is in at step 144.

If the overload protection node is not in overload mode, step 146, then the call attempts should be granted access to the network and the signaling information for the call attempts can be transmitted to the call agent in step 170 or at least moved to the front of a transmittal queue. The overload protection node will transmit further signaling data for the calls to the call agent until the calls are finished, at which point the call agent tears-down the call and processing of the call ends in step 172.

If the overload protection node is in overload mode, step 148, then the call attempts are processed by analyzing the signaling information for call attempts in the queue currently awaiting processing for data corresponding to telephony call identifiers, which are then checked against the black list in step 150.

If one or more telephony call identifiers are on the black list, step 152, then one or more of the black listed call attempts are selected for access denial in step 156, and then discarded in step 168. Black listed call attempts are discarded in this way until overload conditions are no longer detected, or there are no more pending call attempts with black list identifiers.

If the overload protection node is still in overload mode after all black list calls have been discarded, step 154, then call identifiers for call attempts remaining in the queue for processing are checked against the white list in step 158. If one or more telephony call identifiers are not on the white list, step 160, then one or more of those unlisted (neither black nor white listed) call attempts are selected for access denial in step 164, and then discarded in step 168. Unlisted call attempts are discarded in this way until overload conditions are no longer detected, or there are no more pending call attempts without white list identifiers.

If the overload protection node is still in overload mode after all black listed and unlisted calls have been discarded, step 162, then one or more of the white listed call attempts may be selected for access denial in step 166 and then discarded in step 168. White listed call attempts are discarded in this way until the overload protection node no longer detects overload conditions.

At the point during the above operation when overload conditions are no longer detected, step 146, the remaining call attempts can be granted access to the network and the signaling information for the remaining call attempts can be transmitted to the call agent in step 170.

Selection of Call Attempts

When an overload protection node is in overload mode it selects one or more new call attempts to deny access to the network to in order to reduce the amount of signaling information that is transmitted on to one or more call agents it is responsible for protecting. The decision as to which call attempts are selected may depend on a number of different factors or combination of factors.

If soft black/white lists are being employed, then the selection of call attempts can depend on whether any call attempts have black or white listed call identifiers. If this is the case, then call attempts associated with the black list have a higher chance of being selected, and call attempts associated with the white list have a lower chance of being selected.

The call attempts may be selected according to the time at which their signaling information is received at an overload protection node, for example if an overload protection node has been informed that a large volume of call attempts might be expected at a certain time, then call attempts received around this time may be more likely to be selected. In a similar vain, the rate at which the signaling information for call attempts is received at an overload protection node may be used in the selection decision, as for example certain call attempt patterns may distinguish some genuine call attempts from malicious call attempts. The selection could depend on a maximum rate at which call attempts measured over a period of time could be accepted or a minimum interval that should pass in between individual call attempts per individual or group. If a user or group of users has a Quality of Service (QoS) agreement or Service Level Agreement (SLA) then call attempts beyond an agreed capacity could be selected.

The selection decision could depend on the geographical spread of where call attempts are received, where selection is carried out so as to try to ensure that different groups of genuine users of the packet-based telephony service receive at least a minimal level of access to the service. The overload protection node could select call attempts from each MSAN or call service in order to ensure fairness to users who are not participating in a mass call event or DDoS attack.

The selection could also depend on the amount of bandwidth consumed by media from individual calls or groups of calls and if the rate of arrival of media packets for a given call attempt exceeds a certain limit, then all media for that call is discarded and the call terminated. This may require some extra signaling between the overload protection node and a media node.

Overload Protection Node Networks

Figure 5:
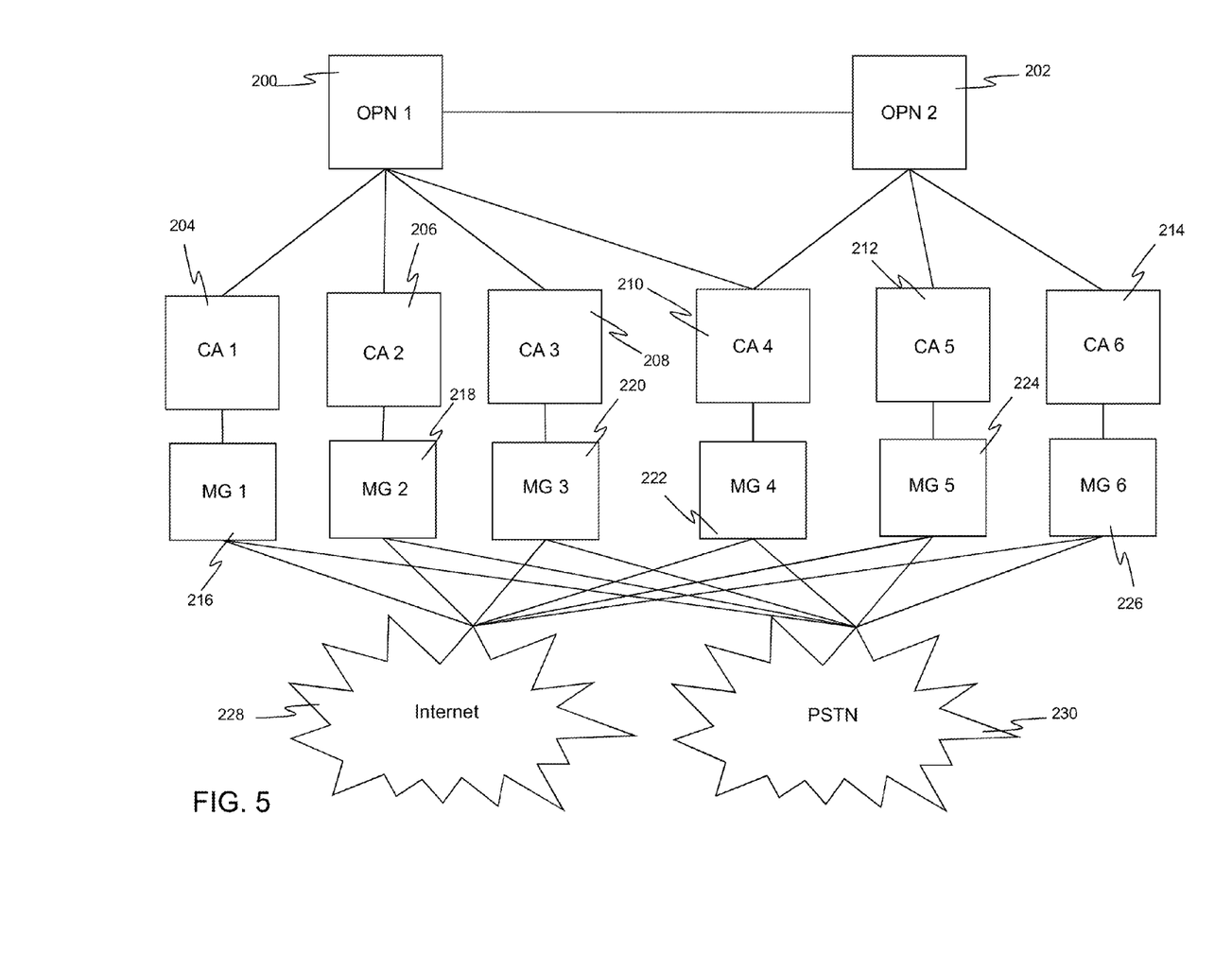
FIG. 5 is a system diagram showing a network of overload protection nodes in a packet-based telephony service according to an embodiment.

FIG. 5 is a system diagram showing a network of two overload protection nodes in a packet-based telephony service according to an embodiment. Here overload protection node OPN 1, shown by item 200, protects four call agents CA 1, CA 2, CA 3 and CA 4, shown by items 204, 206, 208 and 210 respectively. Call agents CA 1, CA 2 and CA 3 are served by media gateways MG 1, MG 2, and MG 3 shown by items 216, 218 and 220 respectively which act as transceivers for the call media data. A further overload protection node OPN 2, shown by item 202, shares the role of protecting CA4 and also protects a further two call agents CA 5 and CA 6, shown by items 212 and 214 respectively.

Call agents CA 4, CA 5 and CA 6 are served by media gateways MG 4, MG 5, and MG 6 shown by items 222, 224 and 226 respectively. All the media gateways have access to the Internet 228 and the PSTN 230 for routing telephone calls accordingly. Any one or more of the media gateways may be shared between two or more call agents. Each call agent will serve a number of call sources (not shown), in practice many more call sources than there are overload protection nodes or call agents)

Overload protection node OPN 1 and overload protection node OPN 2 also have a dedicated connection between them and/or are connected via one or more of their respective call agents and media gateways, the Internet and the PSTN. This ensures that when a characteristic of one overload protection node changes from one state to another, the other overload protection node can be informed efficiently and rapidly by the transmittal of a signal between the overload protection nodes or, alternatively, via one or more call agents that they are responsible for protecting. This can aid in reducing the effect of overload in the network as resources in other parts of the network can be warned in advance of any such overload and can be marshaled against such overloads in advance in case the overload spreads to the other parts of the network. Clearly, a network could have many more overload protection nodes controlling many more call agents, for example, so that a "web" or "farm" of overload protection nodes could be used to protect the whole network from resource overload.

In embodiments, the number of overload protection nodes is envisaged to be relatively small compared to the number of call sources in the network. This means that a warning of the need to take action against overload conditions at one overload protection node can quickly be distributed to all other overload protection nodes without the need for a multicast transport mechanism.

Note also that in embodiments an overload protection node makes no attempt to understand the services or detailed mid-call parameters for each call attempt, as to do so would mean it is effectively another call agent with all the same problems associated with scaling across the network as outlined previously. An overload protection node would thus analyze the call attempt packets at a relatively high level, for example at the header level, as delving any deeper into the signaling information packets would lead to increased delay, which is undesirable for delay-sensitive telephony services.

The overload protection node can be call stateless for peer-to-peer protocols such as SIP. For master/slave protocols such as H.248 it need only maintain knowledge that a line is in a call and the command string used by the call agent to reprogram the line after the previous call attempt. Since this knowledge is easily and quickly re-learnt after failure, an overload protection node can be implemented using N:1 server redundancy and load balancing, thus ensuring efficient scaling across the network i.e. one backup server could be used to protect N overload protection nodes against failure. Furthermore, an overload protection node requires a fraction of the processing power that is required by a call agent due to its high level analysis of call attempt packets, thus enabling cost-effective scaling to handle large increases in signaling traffic using a small cluster of overload protection nodes.

The above embodiments are to be understood as illustrative examples. Further embodiments are envisaged.

Only two modes of operation (overload and non-overload) of the overload protection node have been described above, but other modes are envisaged, for example a hybrid mode could be implemented where certain types of call attempts are granted access under certain conditions if they have a higher security/authenticity rating than other call attempts, or for call attempts where a higher tariff has been or will be paid. This could be used in conjunction with the white and black lists or separate from them entirely.

The embodiments above have been described with reference to a telecommunications network including a packet-based telephony service and depicted in the figures as a packet-based telephony service connected to the PSTN. The present disclosure could also be applied independently of the PSTN such that calls stay entirely in the Internet domain, for example employing Skype™ technology or Internet Protocol Multimedia Subsystem (IMS) for Long Term Evolution (LTE).

More than one characteristic could be monitored at the overload protection nodes and/or signaling nodes and the characteristics may have more possible states than just the first and second states described above.

In alternative embodiments, the monitoring occurs at the signaling node and the processing occurs at the overload protection node. Hence, the burden of processing is partially removed from the signaling node, which may be near or under overload and therefore without sufficient computational resources to perform the necessary processing. In further alternative embodiments, a signal is transmitted from the signaling node to the overload protection node in response to the monitoring indicating the characteristic changing between the first state and the second state. Hence, the signaling node alerts the overload protection node when the characteristic changes state, such that the overload protection node can operate according to the appropriate mode of operation.

The above description and the following claims refer to telephone call attempts in a packet-based telephony service. This is not intended to restrict the area of application of the present disclosure to purely voice calls, and application to other media types is envisaged. The disclosure could be applied to any remote session where data passes from one point to another or vice versa in simplex or duplex form, in real-time or otherwise. The data could be voice, sound, video, fax, email, multimedia or such like.

A characteristic of signaling information for telephone call attempts can be monitored and depending on the state of this characteristic, the processing of signaling information for a call attempt can be altered according to the state of the characteristic.

The processing can be altered between different modes of operation whereby one mode of operation could be used during normal operating conditions and a different mode of operation could be used during overload conditions.

As both the monitoring and processing occur at the overload protection node, the overload protection node can determine the appropriate mode of operation without relying on receiving a signal from the signaling node. This enables overload protection to be provided even if the changing of state of the characteristic would render the signaling node incapable of efficiently communicating that it is overloaded via signaling (for example if insufficient computational resources are available). Further, monitoring at the overload protection node means that only minimal reconfiguration of existing network entities is required.

In some embodiments, the characteristic being in the first state comprises the characteristic not exceeding a first predetermined threshold, and the characteristic being in the second state comprises the characteristic exceeding a second predetermined threshold. Hence, the provider can set the threshold levels according to a typical, known or otherwise acceptable network margin. These first and second thresholds can be the same, or can be different to introduce a hysteresis effect to prevent the rapid changing of modes of operation when the characteristic is fluctuating near the threshold level.

In some embodiments, the first and/or second predetermined threshold comprises one or more of a number of call attempts, a frequency of call attempts and a signaling information handling capacity of the first signaling node. Hence, the threshold can be set near the operating limit of the signaling node for processing calls without becoming overloaded, for example according to the technical specification of the network hardware/software. More complicated characteristics may offer a better approximation to the call handling capacity of the overload protection node at the expense of increased monitoring complexity.

In some embodiments, the characteristic comprises one or more of: a number of call attempts, a frequency of call attempts and a call processing parameter. Hence, the characteristic can be chosen to reflect a possible cause of overload in the signaling node. A call processing parameter may for example include the time taken for the signaling node to respond to signaling messages.

In some embodiments, the first mode of operation involves transmitting signaling information for the first call attempt from the first overload protection node to the first signaling node. Hence, when the characteristic is in the first state, the overload protection node can provide access to the packet based network for the first call attempt.

In some embodiments, the second mode of operation involves the step of selecting one or more call attempts at the first overload protection node for the purpose of reducing overload in the first signaling node. Hence, when the characteristic is in the second state, the overload protection node can select a subset of the call attempts received to be handled in a different manner in order to reduce overload at the signaling node.

In some embodiments, the second mode of operation involves denying access to the packet-based telephony service for the selected one or more call attempts. Hence, overload at the signaling node may be reduced by limiting the amount of signaling information which arrives at a signaling node.

In some embodiments, the denying of access to the packet-based telephony service comprises one or more of discarding signaling information for the selected one or more call attempts, providing a negative call connection response to the selected one or more call attempts and making available network resources previously unavailable due to the selected one or more call attempts. Hence, a variety of different methods can be used to deny access to the packet based network. For specific networking protocols, additional steps may be required to release or free up the telephone line resources previously utilized by rejected call attempts.

In some embodiments, at least a part of the received signaling information is due to genuine call attempts in the packet-based telephony service. In some embodiments, at least a part of the received signaling information is due to a scheduled mass calling event. Hence, it is desirable that some of the call attempts are granted access to the packet based network.

In some embodiments, at least a part of the received signaling information is due to a Denial of Service (DoS) attack in the packet-based telephony service. In some embodiments, the attack involves a plurality of network entities distributed across the packet-based telephony service. Hence, it is desirable that some of the call attempts are denied access to the packet based network.

In some embodiments, the method further comprises the steps of maintaining a black list of telephony call identifiers, whereby a first subset of one or more call attempts in the packet-based telephony service can be identified, selecting one or more call attempts from the first subset in preference to call attempts not from the first subset, and denying access to the packet-based telephony service for the one or more selected call attempts for the purpose of reducing overload in the first signaling node. Hence, when trying to reduce overload in the signaling node, call attempts with call identifiers associated with the black list can be denied access to the packet based network in preference to other call attempts. Thereby, a higher quality of service can be maintained for call attempts with identifiers not on the black list.

In some embodiments, access to the packet-based telephony service is denied for the one or more selected call attempts, even if the characteristic is in the first state. Hence, the black list could contain call identifiers for which call attempts should never be granted access to the packet based network, even if the signaling node is not overloaded.

In some embodiments, the method comprises allowing access to the packet-based telephony service for one or more of the selected call attempts, if the characteristic is in the first state. Hence, when the signaling node is not overloaded, call attempts with call identifiers associated with the black list could be allowed access to the packed based network since there are sufficient unused call handling resources.

In some embodiments, telephony call identifiers associated with an attack are added to the black list. Hence, known malicious call identifiers can be added to the black list, enabling a better response to a subsequent attack using call attempts with the same call identifiers, where such call attempts can be promptly denied access to the packed based network.

In some embodiments, the method further comprises the steps of maintaining a white list of telephony call identifiers, whereby a second, different subset of one or more call attempts in the packet-based telephony service can be identified, selecting one or more call attempts at the overload protection node not from the second subset in preference to call attempts from the second subset, and denying access to the packet-based telephony service for the one or more call attempts selected from call attempts not from the second subset for the purpose of reducing overload in the first signaling node. Hence, when trying to reduce overload in the signaling node, call attempts with call identifiers not associated with the white list can be denied access to the packet based network in preference to white list call attempts. Thereby, a higher quality of service can be maintained for call attempts with identifiers on the white list.

In some embodiments, the method further comprises transmitting signaling information from the first overload protection node to the first signaling node for the second, different subset of one or more call attempts even if the characteristic is in the second state, whereby access to the packet-based telephony service is not denied to the second, different subset of one or more call attempts. Hence, call attempts with call identifiers associated with the white list can be granted access to the packet based network, even if the signaling node is in overload and such calls might otherwise be denied access.

In some embodiments, telephony call identifiers associated with emergency calls and/or essential services are added to the white list. Hence, these calls can be afforded a higher quality of service and/or increased connection reliability.

In some embodiments, the selection is carried out so as to try to ensure that different groups of genuine users of the packet-based telephony service receive at least a minimal level of access to the service. Hence, access can be distributed across a group of genuine users who each receive at least a minimum quality of service so as to avoid the situation where some genuine users receive no service whatsoever.

In some embodiments, one or more of the selecting steps depend upon the rate of reception at the first overload protection node of the signaling information for the one or more call attempts. Hence, if a large volume of signaling information associated with a single call identifier is received at the overload protection node, then that call attempt can be preferentially selected for denial of access to the packed based network.

In some embodiments, the first overload protection node is responsible for protecting further signaling nodes from an overload of signaling information for further telephone call attempts, the further signaling nodes being responsible for handling signaling information for further telephone calls in the packet-based telephony service. Hence, a single overload protection node may protect more than one signaling node from an overload of call attempts.

In some embodiments, the one or more further overload protection nodes are responsible for protecting yet further signaling nodes from an overload of signaling information for yet further telephone call attempts, the yet further signaling nodes being responsible for handling signaling information for yet further telephone calls in the packet-based telephony service. Hence, in more extensive networks, multiple overload protection nodes may be used, each protecting several signaling nodes from an overload of call attempts.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed is:

1. A method for processing signaling information for telephone call attempts in a packet-based telephony service, the method comprising:
   receiving, at a first overload protection node, signaling information for telephone call attempts in the packet-based telephony service, the first overload protection node being responsible for protecting a first signaling node from an overload of signaling information for telephone call attempts, the first signaling node being responsible for handling signaling information for telephone calls in the packet-based telephony service for which media data is handled by a media node, the first overload protection node being located between at least one call source and the first signaling node in a packet-based telecommunications network over which the packet-based telephony service is provided, and the first overload protection node being a network entity which is separate from the at least one call source and the first signaling node in the packet-based telecommunictions network;
   monitoring, at the first overload protection node, a characteristic of signaling information for telephone call attempts that the first signaling node, which is separate from the first overload protection node, is responsible for handling in the packet-based telephony service;
   processing, at the first overload protection node, signaling information for a first call attempt that the first signaling node, which is separate from the first overload protection node, is responsible for handling according to:
      a first mode of operation in response to the monitoring indicating the characteristic of the signaling information for the first call being in a first state; or
      a second, different mode of operation in response to the monitoring indicating the characteristic of the signaling information for the first call being in a second, different state; and
   in response to the monitoring indicating the characteristic of the signaling information for telephone call attempts changing between the first state and the second state, transmitting one or more signals from the first overload protection node that processes signaling information for call attempts for which the first signaling node, which is separate from the first overload protection node, is responsible to one or more further overload protection nodes.

2. A method according to claim 1, wherein the characteristic being in the first state comprises the characteristic not exceeding a first predetermined threshold, and wherein the characteristic being in the second state comprises the characteristic exceeding a second predetermined threshold.

3. A method according to claim 2, wherein the first and/or the second predetermined threshold comprises one or more of:
   a number of call attempts,
   a frequency of call attempts, and
   a signaling information handling capacity of the first signaling node.

4. A method according to claim 1, wherein the characteristic comprises one or more of:
   a number of call attempts, and
   a frequency of call attempts.

5. A method according to claim 1, wherein the first mode of operation involves transmitting signaling information for the first call attempt from the first overload protection node to the first signaling node.

6. A method according to claim 1, wherein the second mode of operation involves selecting one or more call attempts at the first overload protection node for the purpose of reducing overload in the first signaling node.

7. A method according to claim 6, wherein the second mode of operation involves denying access to the packet-based telephony service for the selected one or more call attempts.

8. A method according to claim 7, wherein the denying of access to the packet-based telephony service comprises one or more of:
   discarding signaling information for the selected one or more call attempts,
   providing a negative call connection response to the selected one or more call attempts and
   making available network resources previously unavailable due to the selected one or more call attempts.

9. A method according to claim 1, comprising:
   maintaining a black list of telephony call identifiers, whereby a first subset of one or more call attempts in the packet-based telephony service can be identified;

selecting one or more call attempts from the first subset in preference to call attempts not from the first subset; and denying access to the packet-based telephony service for the one or more selected call attempts for the purpose of reducing overload in the first signaling node.

10. A method according to claim 9, wherein access to the packet-based telephony service is denied for the one or more selected call attempts, even if the characteristic is in the first state.

11. A method according to claim 9, comprising allowing access to the packet-based telephony service for one or more of the selected call attempts, if the characteristic is in the first state.

12. A method according to claim 9, wherein at least a portion of the received signaling information is due to a Denial of Service (DoS) attack in the packet based telephony service, the method comprising adding telephony call identifiers associated with the attack to the black list.

13. A method according to claim 1, comprising:
maintaining a white list of telephony call identifiers, whereby a second, different subset of one or more call attempts in the packet-based telephony service can be identified;
selecting one or more call attempts at the overload protection node not from the second subset in preference to call attempts from the second subset; and
denying access to the packet-based telephony service for the one or more call attempts selected from call attempts not from the second subset for the purpose of reducing overload in the first signaling node.

14. A method according to claim 13 comprising transmitting signaling information from the first overload protection node to the first signaling node for the second, different subset of one or more call attempts even if the characteristic is in the second state, whereby access to the packet-based telephony service is not denied to the second, different subset of one or more call attempts.

15. A method according to claim 1, wherein the selection is carried out so as to try to ensure that different groups of genuine users of the packet-based telephony service receive at least a minimal level of access to the service.

16. A method according to claim 1, wherein one or more of the selecting steps depend upon the rate of reception at the first overload protection node of the signaling information for the call attempts.

17. A method according to claim 1, wherein the first overload protection node is responsible for protecting further signaling nodes from an overload of signaling information for further telephone call attempts, the further signaling nodes being responsible for handling signaling information for further telephone calls in the packet-based telephony service.

18. A method according to claim 1, wherein the one or more further overload protection nodes are responsible for protecting yet further signaling nodes from an overload of signaling information for yet further telephone call attempts, the yet further signaling nodes being responsible for handling signaling information for yet further telephone calls in the packet-based telephony service.

19. An overload protection node comprising:
a first interface to receive signaling information for telephone call attempts in a packet-based telephony service, the overload protection node being responsible for protecting a first signaling node from an overload of signaling information for telephone call attempts, the first signaling node being responsible for handling signaling information for telephone calls in the packet-based telephony service for which media data is handled by a media node, the overload protection node being located between at least one call source and the first signaling node in a packet-based telecommunications network over which the packet-based telephony service is provided, and the overload protection node being a network entity which is separate from the at least one call source and the first signaling node in the packet-based telecommunications network;
one or more processer functions to monitor a characteristic of signaling information for telephone call attempts that the first signaling node, which is separate from the overload protection node, is responsible for handling in the packet-based telephony service;
one or more processer functions to process signaling information for a first call attempt that the first signaling node, which is separate from the overload protection node, is responsible for handling according to:
a first mode of operation in response to the monitoring indicating the characteristic of the signaling information for the first call being in a first state; or
a second, different mode of operation in response to the monitoring indicating the characteristic of the signaling information for the first call being in a second, different state; and
a second interface to transmit, in response to the monitoring indicating the characteristic of the signaling information for telephone call attempts changing between the first state and the second state, one or more signals from the overload protection node that processes signaling information for call attempts for which the first signaling node, which is separate from the overload protection node, is responsible to one or more further overload protection nodes.

20. A computer program product comprising a non-transitory computer-readable storage medium having computer readable instructions stored thereon, the computer readable instructions being executable by a computerized device to cause the computerized device to perform a method for processing signaling information for telephone call attempts in a packet-based telephony service, the method comprising:
receiving at a first overload protection node signaling information for telephone call attempts in the packet-based telephony service, the first overload protection node being responsible for protecting a first signaling node from an overload of signaling information for telephone call attempts, the first signaling node being responsible for handling signaling information for telephone calls in the packet-based telephony service for which media data is handled by a media node, the first overload protection node being located between at least one call source and the first signaling node in a packet-based telecommunications network over which the packet-based telephony service is provided, and the first overload protection node being a network entity which is separate from the at least one call source and the first signaling node in the packet-based telecommunications network;
monitoring, at the first overload protection node, a characteristic of signaling information for telephone call attempts that the first signaling node, which is separate from the first overload protection node, is responsible for handling in the packet-based telephony service;
processing, at the first overload protection node, signaling information for a first call attempt that the first signaling node, which is separate from the first overload protection node, is responsible for handling according to:
  a first mode of operation in response to the monitoring indicating the characteristic of the signaling information for the first call attempt being a first state; or
  a second, different mode of operation in response to the monitoring indicating the characteristic of the signaling information for the first call attempt being in a second, different state; and
in response to the monitoring indicating the characteristic of the signaling information for telephone call attempts changing between the first state and the second state, transmitting one or more signals from the first overload protection node that processes signaling information for call attempts for which the first signaling node, which is separate from the first overload protection nodes, is responsible to one or more further overload protection nodes.

* * * * *

UNITED STATES PATENT AND TRADEMARK OFFICE
CERTIFICATE OF CORRECTION

PATENT NO. : 9,491,302 B2
APPLICATION NO. : 14/039969
DATED : November 8, 2016
INVENTOR(S) : Brittain It is certified that error appears in the above-identified patent and that said Letters Patent is hereby corrected as shown below:

In the Claims

Column 17, Line 38, in Claim 15, delete "according to claim 1" and insert --according to claim 13--

Signed and Sealed this
Second Day of July, 2019

Andrei Iancu
*Director of the United States Patent and Trademark Office*